US012796583B2

(12) United States Patent
Lawson

(10) Patent No.: US 12,796,583 B2
(45) Date of Patent: Nov. 17, 2026

(54) WORK VEHICLES WITH CONSTANT CURVATURE CONTROL DURING STEERING MODE TRANSITIONS

(71) Applicant: Deere & Company, Moline, IL (US)

(72) Inventor: Joshua T. Lawson, Woodbury, MN (US)

(73) Assignee: DEERE & COMPANY, Moline, IL (US)

( * ) Notice: Subject to any disclaimer, the term of this patent is extended or adjusted under 35 U.S.C. 154(b) by 312 days.

(21) Appl. No.: 18/649,605

(22) Filed: Apr. 29, 2024

(65) Prior Publication Data

US 2025/0331438 A1 Oct. 30, 2025

(51) Int. Cl.

*B62D 5/09* (2006.01)
*A01B 69/00* (2006.01)

(Continued)

(52) U.S. Cl.

CPC ............ *A01B 69/007* (2013.01); *B62D 5/091* (2013.01); *B62D 5/18* (2013.01); *B62D 6/001* (2013.01); *B62D 6/002* (2013.01)

(58) Field of Classification Search

CPC .......... B62D 5/07; B62D 5/065; B62D 5/091; B62D 6/002; B62D 7/1509; B62D 5/046;

(Continued)

(56) References Cited

U.S. PATENT DOCUMENTS 5,088,573 A 2/1992 Moll
5,147,008 A 9/1992 Nishimore et al.

(Continued)

FOREIGN PATENT DOCUMENTS

EP 4032738 A1 7/2022
EP 4032739 A1 7/2022

OTHER PUBLICATIONS

Wikipedia, Ackermann steering geometry article, accessed Jan. 30, 2024 at https://en.wikipedia.org/w/index.php?title=Ackermann_steering_geometry (3 pages).

(Continued)

*Primary Examiner* — Hai H Huynh
*Assistant Examiner* — Johnny H Hoang
(74) *Attorney, Agent, or Firm* — KLINTWORTH & ROZENBLAT LLP

(57) ABSTRACT

A steering control system for a work vehicle can include an operator control providing a steering input indicating a curvature heading of the vehicle, a hydraulic steering system responsive to the steering input from the operator control to effect the curvature heading, and a control system configured to detect, based on the steering input from the operator control, a change in a center of rotation of the vehicle, determine, based on the steering input from the operating control, a velocity of the change in the center of rotation of the vehicle, determine, based on the velocity of the change in the center of rotation, a transition steering input to effect a constant curvature heading during a transition period, and command, based on the transition steering input, the cylinder control valve to alter hydraulic flow or pressure to the hydraulic cylinders to steer the work vehicle at the constant curvature heading.

20 Claims, 6 Drawing Sheets

(51) Int. Cl.
*B62D 5/18* (2006.01)
*B62D 6/00* (2006.01)

(58) Field of Classification Search
CPC ........ B62D 5/30; B62D 5/003; B62D 5/0463; B62D 5/064; B62D 5/00; B62D 5/09; B62D 5/0481; B62D 5/0403; B62D 15/0215; A61B 69/007
USPC ........................................................ 701/41–44
See application file for complete search history.

(56) References Cited

U.S. PATENT DOCUMENTS

| | | | |
|---|---|---|---|
| 9,439,341 B2 | 9/2016 | Bebernes et al. | |
| 10,766,526 B2 | 9/2020 | Bebernes et al. | |
| 2003/0122328 A1* | 7/2003 | Lin ...................... | B60G 17/005<br>280/5.514 |
| 2011/0224872 A1* | 9/2011 | Reed ...................... | B62D 6/002<br>701/41 |
| 2017/0341915 A1* | 11/2017 | Kaneko .................... | B62D 5/06 |
| 2018/0170425 A1 | 6/2018 | Jung | |
| 2022/0126910 A1* | 4/2022 | Zhao ...................... | B62D 5/046 |
| 2022/0332366 A1 | 10/2022 | Sonoda et al. | |
| 2023/0161355 A1* | 5/2023 | Hita ..................... | G05D 1/0225<br>701/26 |

OTHER PUBLICATIONS

Non-Final Office Action issued in U.S. Appl. No. 18/649,555 dated Jun. 3, 2026.

* cited by examiner

WORK VEHICLES WITH CONSTANT CURVATURE CONTROL DURING STEERING MODE TRANSITIONS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to steering systems for work vehicles, and specifically, to automated steering control in hydraulic steering systems.

BACKGROUND OF THE DISCLOSURE

The efficiency and operational precision of work vehicles may be influenced by the sophistication and responsiveness of the steering control systems. In environments such as agricultural fields, construction sites, and industrial settings, for example, the ability of the work vehicle operator to precisely direct the vehicle's path may be of critical importance. This precision not only enhances the vehicle's performance but also contributes to the overall safety and effectiveness of the tasks being performed. Traditional steering systems may lack the nuanced control needed for complex operations, especially under varying load and terrain conditions. Advancements in hydraulic steering and control technologies have led to the development of more adaptive and responsive steering systems. These systems, by integrating sensors and intelligent control units, for example, allow for real-time adjustments to steering commands, ensuring consistent handling characteristics irrespective of external conditions. The move towards incorporating such advanced steering control mechanisms aligns with the industry's push for higher work vehicle uptime, reduced maintenance, and the potential for semi-autonomous or fully autonomous operations that not only reduce or avoid the physical demands on operators but also enhance the precision and safety of vehicle operations, thereby extending the operational capabilities of work vehicles in challenging environments.

SUMMARY OF THE DISCLOSURE

According to some embodiments, the present disclosure is directed to a steering control system for a work vehicle comprising: an operator control providing a steering input indicating a curvature heading of the work vehicle, a hydraulic steering system having a steering pump, hydraulic cylinders, and a cylinder control valve responsive to the steering input from the operator control to effect the curvature heading, and a control system having processor and memory architecture coupled to the operator control and the hydraulic steering system and configured to: (1) detect, based on the steering input from the operator control, a change in a center of rotation of the work vehicle; (2) determine, based on the steering input from the operating control, a velocity of the change in the center of rotation of the work vehicle; (3) determine, based on the velocity of the change in the center of rotation, a transition steering input to effect a constant curvature heading during a transition period between single-axle and multi-axle steering of the work vehicle; and (4) command, based on the transition steering input, the cylinder control valve to alter hydraulic flow or pressure to the hydraulic cylinders to steer the work vehicle at the constant curvature heading.

In one embodiment, a steering control system of the work vehicle comprises a first axle and a second axle having ground engaging members associated with the hydraulic cylinders, and wherein the first axle includes a first of the ground engaging members and a first of the hydraulic cylinders and a second of the ground engaging members and a second of the hydraulic cylinders.

In another embodiment, the first and second ground engaging members each rotate about an axis of rotation that is orthogonal to the turning point radius, wherein the first and second ground engaging members each turn about an upright steering axis that is orthogonal to the axis of rotation, and wherein the control system is configured to calculate a steering rate at which the first and second ground engaging members turn about the associated steering axis.

In one embodiment, the control system is configured to adjust the steering rate of the first and second ground engaging members so that the axis of rotation of each of the first and second ground engaging members intersects a turning radius point, and wherein the control system is configured to determine a mean effective angle of the first axle that is an average of the steering angles of the first and second ground engaging members.

In another embodiment, the control system is configured to adjust the mean effective angle of the first axle by causing the cylinder control valve to alter hydraulic flow or pressure to the hydraulic cylinders to change the steering rate of the first and second ground engaging members so that the axis of rotation of each of the first and second ground engaging members intersects a turning radius point.

In one embodiment, the control system is further configured to monitor the steering input from the operator control during the transition period, and adjust the transition steering input based on the steering input from the operator control to effect a different constant curvature heading. The control system is configured to dampen a change in a steering rate associated with the steering input or a change in the center of rotation of the work vehicle or both. The control system is configured to cause the cylinder control valve to adjust the alteration of the hydraulic flow or pressure to the hydraulic cylinders during the transition period not to exceed a steering rate threshold. The control system is configured to receive operator input of the center of rotation of the work vehicle and effect a change in the center of rotation of the work vehicle based on the operator input not to exceed a center of rotation rate threshold.

According to other embodiments, the present disclosure includes a work vehicle comprising: a front axle and a rear axle, the front axle comprising ground engaging members, the ground engaging members mounted to a chassis to support the chassis off the ground; steering assembly carried by the chassis including; an operator control providing a steering input indicating a curvature heading of the work vehicle; a hydraulic steering system having a steering pump, hydraulic cylinders, and a cylinder control valve responsive to the steering input from the operator control to effect the curvature heading; and a control system having processor and memory architecture coupled to the operator control and the hydraulic steering system and configured to: (1) detect, based on the steering mode input from the operator control, a change in a center of rotation of the work vehicle; (2)

determine, based on the steering input from the operating control, a velocity of the change in the center of rotation of the work vehicle; (3) determine, within predefined steer rate limits and based on the steering input, a maximum velocity for the change in the CoR; (4) calculating a transition steering input required to maintain the curvature heading during a transition between single-axle steering (SAS) and multi-axle steering (MAS) modes; and (5) command, based on the transition steering input, the cylinder control valve to alter hydraulic flow or pressure to the hydraulic cylinders to steer the work vehicle at the curvature heading.

In one embodiment, the front axle includes a first of the ground engaging members and a first of the hydraulic cylinders and a second of the ground engaging members and a second of the hydraulic cylinders. The first and second ground engaging members each rotate about an axis of rotation that is orthogonal to the turning point radius, wherein the first and second ground engaging members each turn about an upright steering axis that is orthogonal to the axis of rotation, and wherein the control system is configured to calculate a steering rate at which the first and second ground engaging members turn about the associated steering axis.

In various embodiments, the control system is configured to adjust the steering rate of the first and second ground engaging members so that the axis of rotation of each of the first and second ground engaging members intersects a turning radius point. The control system is configured to determine a mean effective angle of the front axle that is an average of the steering angles of the first and second ground engaging members.

In some embodiments, the control system is configured to adjust the mean effective angle of the front axle by causing the cylinder control valve to alter hydraulic flow or pressure to the hydraulic cylinders to change the steering rate of the first and second ground engaging members so that the axis of rotation of each of the first and second ground engaging members intersects a turning radius point.

An example control system is further configured to monitor the steering input from the operator control during the transition period, and adjust the transition steering input based on the steering input from the operator control to effect a different constant curvature heading. The control system is configured to dampen a change in a steering rate associated with the operator input or a change in the center of rotation of the work vehicle or both.

The control system is configured to cause the cylinder control valve to adjust the alteration of the hydraulic flow or pressure to the hydraulic cylinders during the transition period not to exceed a steering rate threshold. The control system is configured to receive operator input of the center of rotation of the work vehicle and effect a change in the center of rotation of the work vehicle based on the operator input not to exceed a center of rotation rate threshold.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
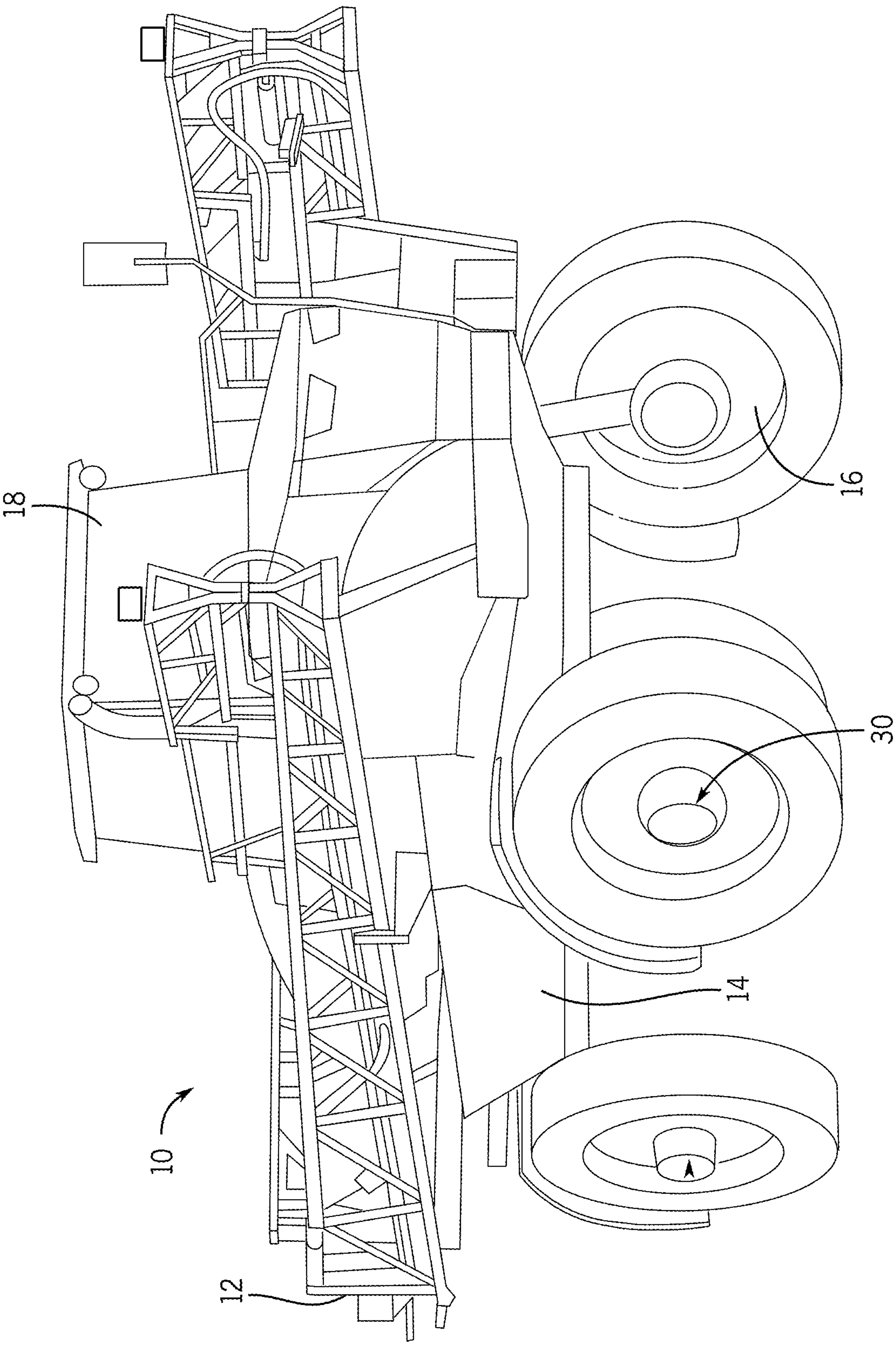
FIG. 1 is a perspective view of an example work vehicle that can be used to implement embodiments of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

Overview

The present disclosure pertains to an advanced steering control system with enhanced maneuverability and steering performance for work vehicles. This innovative system integrates mechanical components, hydraulic mechanisms, and sophisticated control algorithms to provide a intuitive and adaptive steering response under varying operational conditions.

The disclosed system includes an operator control interface that captures steering commands indicative of the desired trajectory curvature of travel for the work vehicle. This input is processed by a control system, which includes processor and memory architecture, to dynamically adjust the hydraulic steering system. The hydraulic steering system, which includes a steering pump, hydraulic cylinders, and a cylinder control valve, is responsively tuned to effectuate the trajectory curvature as dictated by the operator steering command.

The system senses the velocity of the steering command from the operator control. Based on this sensed velocity, the control system determines an expected rate of change of the trajectory curvature and an adjusted steering command that corresponds to a constant rate of change of the trajectory curvature. This allows for the command of the cylinder control valve to alter hydraulic flow or pressure to the hydraulic cylinders, thereby steering the work vehicle at the desired rate of change of the trajectory curvature of travel.

Ground engaging members (e.g., wheels or tracks), each coupled to an associated hydraulic cylinder, are configured to rotate, with their associated hydraulic cylinders tied together in a closed-loop hydraulic circuit through the cylinder control valve. This arrangement enables extending a piston of the hydraulic cylinder for one ground engaging member to cause retraction of a piston of the hydraulic cylinder for another.

The control system, through its evaluation of steering angles associated with the ground engaging members and the application of adjusted steering commands, commands the cylinder control valve to either direct hydraulic fluid from the closed-loop hydraulic circuit to a supply tank for a dampened steering response or to increase the flow of hydraulic fluid from a primary pump to the closed-loop hydraulic circuit for a heightened steering response. This adaptive response is further refined by considering the velocity of the steering command and various operational parameters of the work vehicle, such as steering angle, ground speed, load condition, and the posture of a work implement. By providing an adaptive, responsive, and precise steering control, the system not only enhances the operational efficiency and safety of work vehicles but also represents a technical solution to the technical challenges inherent in automatic vehicle steering control.

Implementing advanced steering control in agricultural machinery significantly mitigates crop damage during operations, particularly in maneuvering through field turns, such as various headland turns. Precision in steering not only enhances operational efficiency but also plays a crucial role in preserving crop integrity and avoiding inadvertent crop trampling that may result in tangible losses in crop yield and, consequently, farmer income. The adoption of semi- or fully-automated steering systems in agricultural vehicles addresses this issue by ensuring that the machinery adheres to predetermined paths with high accuracy, thereby minimizing the extent of crop damage during these operations, farmers can achieve higher efficiency and sustainability in their farming practices, leading to better crop yields and enhanced economic returns.

Example embodiments of steering control systems for work vehicles will now be discussed in greater detail in connection with the accompanying drawings. While the example steering control systems are principally described below in the context of a particular type of work machine, embodiments of the steering control systems can be utilized in conjunction with a wide range of work vehicles deployed in the construction, agriculture, forestry, and mining industries, as well as in other industrial contexts. Accordingly, the following description should be understood as merely providing a non-limiting example context in which embodiments of the present disclosure may be better understood.

Example Steering Control System for Work Vehicles

Referring to FIG. 1, an example work vehicle 10 in the form of a self-propelled vehicle (e.g., an agricultural sprayer) houses or otherwise supports a sprayer system 12. The work vehicle 10 may be either a manned or autonomous vehicle. As is known, the sprayer system 12 may be primarily implemented to distribute and/or disperse a primary fluid (e.g., fertilizer, insecticide, water, or other fluid) across a geographical area (e.g., a field). The sprayer system 12 may include a fluid source and a pump coupled to a plurality of spray nozzles via an arrangement of plumbing lines, which generally corresponds to the system or array of lines, conduits, valves, tanks, and the like that facilitate the flow of primary fluid (and other fluids) within the sprayer system 12. Generally, the work vehicle 10 may include a vehicle frame or chassis 14 that is supported off the ground, by ground engaging members 16 (e.g., wheels or tracks) and which supports a cab 18.

Figure 2:
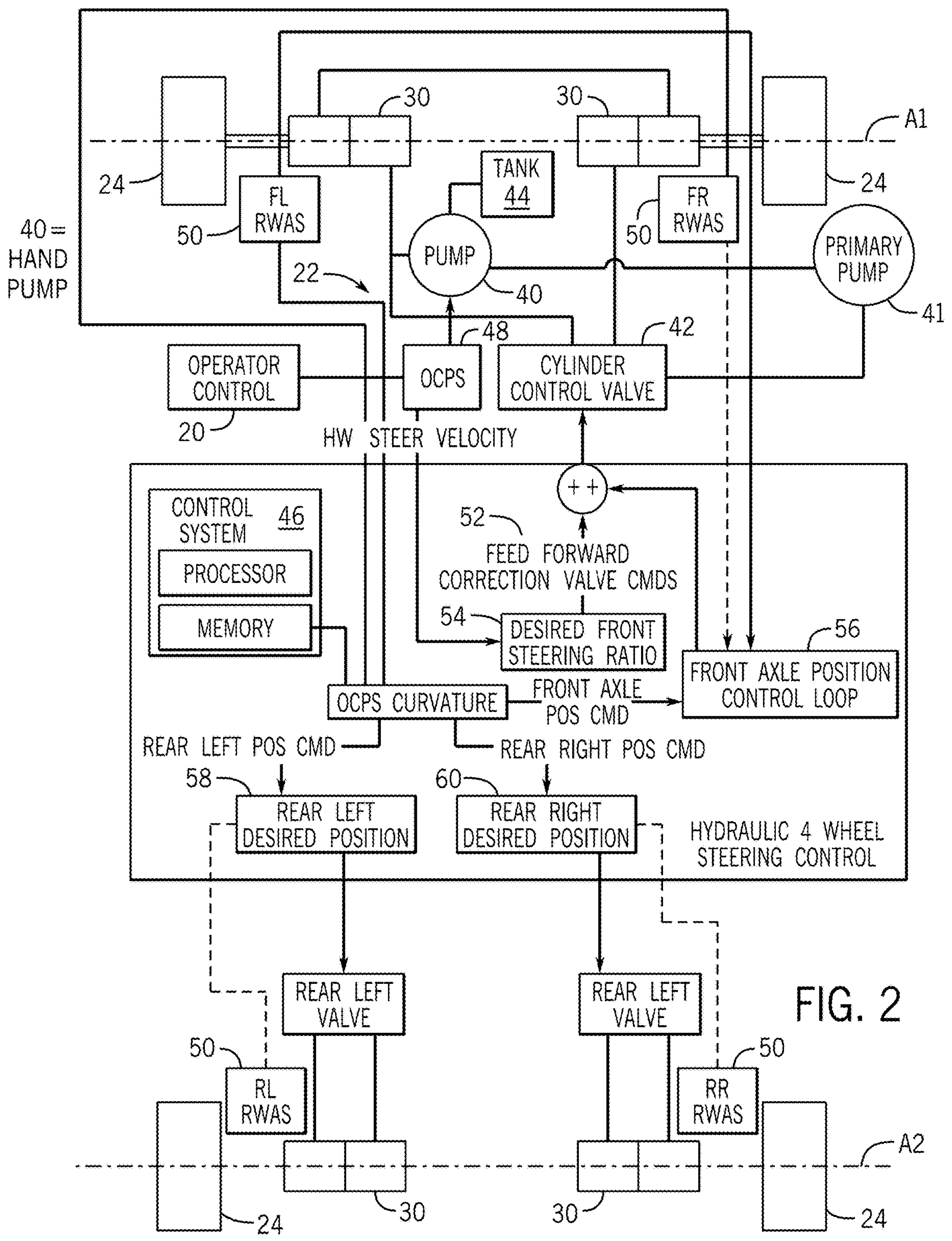
FIG. 2 is a schematic view of an example steering control system of thereof.

Referring now to FIG. 2, a schematic diagram of a portion of the work vehicle 10 is illustrated. In general, the work vehicle 10 includes an operator control 20 providing a steering command indicating a trajectory curvature of travel for the work vehicle. The operator control 20 can include a steering wheel that is mechanically coupled to a hydraulic steering system 22. The operator control 20 receives rotational input from an operator that is used by the hydraulic steering system 22 to cause changes in the steering angle (sometimes referred to as the "road wheel angle") of the ground engaging members 24 as the operator steers.

In more detail, the work vehicle comprises four ground engaging members 24 that include a front pair of ground engaging members and a rear pair of ground engaging members. In an orientation providing for straight-ahead travel of the vehicle, the front pair of ground engaging members 24 rotate about an axle axis A1, and the rear pair of ground engaging members 24 rotate about an axle axis A2.

Each of the ground engaging members 24 is hydraulically coupled to a hydraulic cylinder 30. The hydraulic cylinders are part of the hydraulic steering system 22 which also includes a hand pump 40, primary pump 41, and a cylinder control valve 42. The hydraulic steering system 22 can also include a supply tank 44. In some embodiments, the front two hydraulic cylinders 30 are tied together in a closed-loop hydraulic circuit that includes the cylinder control valve 42. In general, the cylinder control valve 42 can be operated by a control system, described in greater detail infra, to control flow of hydraulic fluid to the front hydraulic cylinders 30 to ensure a constant (or designed) steering ratio for the work vehicle 10.

Stated otherwise, the operator control 20 provides a steering command indicating a trajectory curvature of travel for the work vehicle 10. The hydraulic steering system 22 is responsive to the steering command from the operator control 20 to effect the trajectory curvature. The work vehicle 10 includes an electronic control system 46 that includes processor and memory architecture coupled to the operator control 20 and the hydraulic steering system 22. In some instances, the control system 46 includes an operator control position sensor (OCPS) 48 that receives input from the operator control 20 to determine the steering command. In some embodiments, the OCPS 48 provides information that is indicative of the velocity of the steering command from the operator control 20.

Also, each of the ground engaging members 24 is associated with a steering angle sensor 50 to measure the steering angle of the ground engaging members 24. These sensors 50 are used by the control system 46 to ultimately adjust the work vehicle's direction based on various inputs, including the steering command, the engine speed, the vehicle speed and the actual steering angle of the ground engaging members 24. By sensing the steering angle of each ground engaging member 24, these sensors 50 allow the work vehicle's control system 46 to accurately determine the work vehicle's current direction of travel and make adjustments to the steering to achieve the desired trajectory.

After detecting the velocity of the steering command from the operator control 20, the control system 46 can determine, based on the sensed velocity of the steering command, an expected rate of change of the trajectory curvature. The process of determining an expected rate of change of the trajectory curvature based on the sensed velocity of the steering command involves predicting (e.g., Steering Ratio) how quickly the path or direction (trajectory curvature) of the work vehicle 10 will change over time given the current rate at which the steering command is being altered by the operator. This prediction is used by the control system 46 in adjusting the response of the hydraulic steering system 22 to ensure smooth and accurate vehicle handling. The control system 46 uses the velocity of the steering command to forecast the future steering ratio of the work vehicle 10, allowing for adjustments to the hydraulic steering system 22. This ensures that the work vehicle's movement aligns with the operator input, enhancing control and safety, particularly at different speeds or operational conditions.

The control system 46 can also be configured to determine, based on the expected rate of change of the trajectory curvature, an adjusted steering command associated with a constant rate of change of the trajectory curvature. In general, the control system 46 can determine an adjusted steering command, which is a scaled version of the actual input as determined from the velocity of the steering command. The steering command is adjusted to ensure a constant rate of change of the trajectory curvature, in view of the expected rate of change of the trajectory curvature.

The concept of determining an adjusted steering command based on the expected rate of change of the trajectory curvature, as mentioned in the context of the work vehicle's steering control system, involves predicting how quickly the direction (trajectory curvature) of the work vehicle 10 will change based on the current steering command's velocity. The control system 46 uses this prediction to calculate an adjustment to the steering command that would result in a constant steering ratio of the work vehicle 10, regardless of the initial steering command velocity. This approach allows for smoother and more predictable vehicle steering by ensuring that changes in direction occur at a consistent pace, enhancing maneuverability and stability.

Based on the above, the control system 46 is configured to control the cylinder control valve 42 in such a way that a constant relationship between the movement of the operator control 20 and the corresponding steering angle change of the front ground engaging members 24 is maintained, irrespective of the steering mode or configuration of the work vehicle 10. This concept ensures that the steering feel and response remain consistent for the operator, even as the work vehicle's steering conditions or configurations change, such as when switching between two-wheel steering (2WS) and four-wheel steering (4WS) modes. By dynamically adjusting the proportion of the steering command that affects the front ground engaging members 24, the cylinder control valve 42 (or a similar system component) can neutralize a portion of the steering angle. This adjustment means that despite changes in the work vehicle's steering configuration, the overall steering ratio (i.e., the ratio of the degrees the operator control 20 is turned to the degrees the ground engaging members 24 turn) stays constant. This aims to provide a predictable and uniform steering experience, enhancing control and comfort for the operator across different driving conditions.

The control system 46 can then command, based on the adjusted steering command, the cylinder control valve 42 to alter hydraulic flow or pressure to the hydraulic cylinders 30 to steer the work vehicle 10 at the constant rate of change of the trajectory curvature. Stated otherwise, this process involves the control system 46 calculating adjustments that ultimately effect changes in steering angle of the ground engaging members 24 based on the adjusted steering commands. The control system 46 commands the cylinder control valve 42 to modulate the flow or pressure of hydraulic fluid to the hydraulic cylinders 30 for the front ground engaging members 24. The modulation of hydraulic flow or pressure adjusts the position and/or movement of the ground engaging members 24 to steer the work vehicle 10 according to the planned path, which is defined by a constant rate of change of the trajectory curvature.

For example, if the adjusted steering command dictates a gradual increase in curvature to the right, the control system 46 will command the cylinder control valve 42 to adjust the hydraulic flow to the hydraulic cylinders 30 in such a manner that the rightward steering is achieved smoothly and at a constant ratio. This could mean increasing the hydraulic pressure to the hydraulic cylinder 30 on one side of the work vehicle 10 while decreasing it on the other side to steer the work vehicle 10 to the right.

The control system 46 can implement a feed-forward control that takes into account the disturbances or changes in steering velocity and calculates a necessary action to mitigate course deviations from the constant curvature. Essentially, such feed-forward control acts proactively based on the predictions generated from the steering command and the desired outcome, which is maintaining a constant trajectory curvature.

The feed-forward signals in one instance are the commands sent to the cylinder control valve 42 in anticipation of the required changes in steering based on inputs like the desired steering rate and steering command velocity. The control system 46 uses these predicted inputs to maintain a constant steering ratio even as the work vehicle turns which improves the stability and predictability in how the work vehicle 10 handles.

In more detail, in FIG. 2, an example control system 46 data flow is illustrated within the dashed line shown. In this configuration, it is assumed that in most instances, a steering ratio would otherwise double when 4WS is enabled. The physical relationship between the operator control 20 and the front ground engaging members 24 (i.e., the hand-wheel and road-wheel relationship) is typically fixed through the hydraulics architecture. In more detail, the OCPS 48 detects the position of the operator control 20 after or during the operator input of the desired direction and turning angle, which serves as the primary input for the control system 46.

The cylinder control valve 42 acts as a regulator or modulator, receiving input from the OCPS 48, and altering the hydraulic flow or pressure to adjust the steering dynamics, thereby maintaining a constant steering ratio. The Feed Forward Correction Valve Commands 52 are predictive control commands generated by the control system 46 as described above in order to anticipate the required steering adjustments. By assessing the desired front steering rate, the control system 46 can compensate for any necessary changes. The Desired Front Steering Ratio 54 indicates the target rate at which the front ground engaging members 24 should turn, based on the operator input resolved by the OCPS 48. The Front Axle Position Control Loop 56 is a feedback system that ensures the actual steering angle matches the desired angle commanded by the operator, and the OCPS→Curvature defines the relationship between the position of the operator control 20 and the curvature of the work vehicle's path, ensuring that the steering command results in the appropriate travel trajectory. Commands for the Rear Left Desired Position 58 and Rear Right Desired Position 60 are outputs from the control system 46 that determine the desired position of the rear ground engaging member 24. These commands ensure that the steering angle of the rear ground engaging members 24 complements the steering angle of the front ground engaging members 24 to maintain work vehicle stability and maneuverability.

In some instances, the control system 46 can be configured to establish and enforce threshold values. For example, the control system 46 can be programmed so that the adjusted steering command is resolved such that the control system 46 commands the cylinder control valve 42 to effect a dampened steering response when the velocity of the steering command is above a threshold velocity value. The control system 46 is programmed to monitor the rate at which the operator control 20 is turned (angular velocity in degrees per second) and compare this to a predefined threshold value.

In the operation of the control system 46, one feature is the maintenance of a constant steering ratio, ensuring that for any given input from the operator control 20, the resultant change in the vehicle's curvature remains consistent, irrespective of whether the work vehicle 10 is in two-wheel or four-wheel steering mode. This is achieved without imposing restrictions on the rate at which the operator may choose to steer. Instead of constraining steering speed, the control system 46 dynamically adjusts the hydraulic flow or pressure via the cylinder control valve 42 to the hydraulic cylinders 30 associated with the front ground engaging members. This adjustment ensures that the steering command is translated into curvature changes at a consistent ratio, providing predictable and uniform vehicle handling. Through this mechanism, the control system 46 seamlessly ensures that the steering responsiveness and vehicle maneuverability are optimized, enhancing the operational efficiency and safety of the work vehicle 10 across varying steering scenarios.

The control system 46 can be programmed so that the adjusted steering command is based, in part, on certain operational parameters. Examples of operational parameters include, but are not limited to, the steering angle of the front ground engaging members 24, an engine or ground speed of the work vehicle 10, a load condition of the work vehicle 10, and a posture of a work implement of the work vehicle 10 and so on.

In some embodiments or operational conditions of the work vehicle 10, based on the adjusted steering command, the control system 46 commands the cylinder control valve 42 to direct an increased flow of hydraulic fluid from the primary pump 41 (not shown) to the closed-loop hydraulic circuit to effect a heightened steering response.

In certain embodiments, the control system 46 uses the adjusted steering command by modulating the hydraulic fluid flow. This is achieved through commands sent to the cylinder control valve 42, prompting it to allow an increased flow of hydraulic fluid from a supply tank to the hydraulic circuit. The control system 46 calculates the required adjustment in flow rate or pressure based on the magnitude and nature of the steering command deviation from a baseline or expected behavior, which can be determined, for example, through real-time monitoring of steering dynamics and vehicle operational parameters.

When the operator of the work vehicle 10 executes a steering command, the control system 46 does not seek to dampen or smooth this input for the sake of stability or rollover prevention. Rather, the control system 46 actively analyzes the steering command in the context of the vehicle's current steering mode, be it two-wheel or four-wheel steering (as well as operational parameters mentioned above). Upon recognizing any significant deviation in the input that could affect the steering ratio, the control system 46 promptly calculates and applies a precise adjustment to the hydraulic flow or pressure via the cylinder control valve 42 to the hydraulic cylinders 30 associated with the ground engaging members. This calculated adjustment is designed to ensure that the input results in a consistent curvature change, maintaining a constant steering ratio across different steering modes. By focusing on ratio adjustments, the control system 46 enables the work vehicle 10 to respond predictably to the operator's inputs, enhancing maneuverability without compromising on the vehicle's operational efficiency or handling characteristics.

Moreover, the control system 46 can adapt the threshold and degree of this heightened response based on various operational parameters of the work vehicle 10. These parameters can include but are not limited to engine or vehicle speed, the angle of the steering command, the load being carried or towed by the work vehicle 10, and the type or position of any attached implements. Such adaptability ensures that the work vehicle's response is tuned to both the operator's expectations and the current operational context (parameters), thereby optimizing the work vehicle's performance and safety.

According to some embodiments, the adjusted steering command is resolved such that the control system 46 commands the cylinder control valve 42 to increase or decrease flow or pressure to the hydraulic cylinders 30 of the front ground engaging members 24 ground engaging For example, in scenarios necessitating precision, such as navigating through densely planted crops or avoiding obstacles within a tight space, the control system 46 could increase the hydraulic flow or pressure incrementally for subtle adjustments in direction, enhancing maneuverability while maintaining a slow pace needed for accurate work operations. Conversely, in instances where maintaining a straight course with minimal deviation is crucial, possibly during linear passes over a field, the control system 46 can modulate the flow or pressure to the hydraulic cylinders 30 of the front ground engaging members 24 so that the desired steering ratio is achieved.

The control system 46 may also command the cylinder control valve 42 to increase flow to the hydraulic cylinders 30 of the front ground engaging members 24 to effect a 4WS response or a 2WS response, resulting in an increased steering ratio. When the operational situation demands enhanced agility, such as during tight turns within crop rows or when maneuvering around obstacles, for example, the control system 46 can cause the cylinder control valve 42 to increase the hydraulic fluid flow or pressure to the hydraulic cylinders 30 of the front ground engaging members 24. This action results in 4WS response, where all four wheels pivot, offering a tighter turning radius and superior maneuverability allowing the operator to make sharper turns. Conversely, there are scenarios where precision and straight-line stability take precedence over maneuverability, such as when applying chemicals over long, straight stretches of land. In these instances, the control system 46 can cause the cylinder control valve 42 to decrease the hydraulic flow to the hydraulic cylinders 30 for the front ground engaging members 24, effectively transitioning the work vehicle 10 into a 2WS mode in which only the front or rear ground engaging members 24 turn to steer the work vehicle 10.

By increasing or decreasing the hydraulic flow or pressure to the hydraulic cylinders 30 of the front ground engaging members 24, the control system 46 can manipulate the work vehicle's handling characteristics. For instance, increasing hydraulic flow or pressure might simulate the effect of rear ground engaging members turning in the same direction as the front ground engaging members (common in high-speed 4WS for stability), while decreasing hydraulic flow or pressure might simulate the rear ground engaging members turning in the opposite direction (used in low-speed maneuvers for agility). This method provides a flexible steering response, adapting to various driving conditions without the mechanical complexity of a physical 4WS system.

Figure 5:
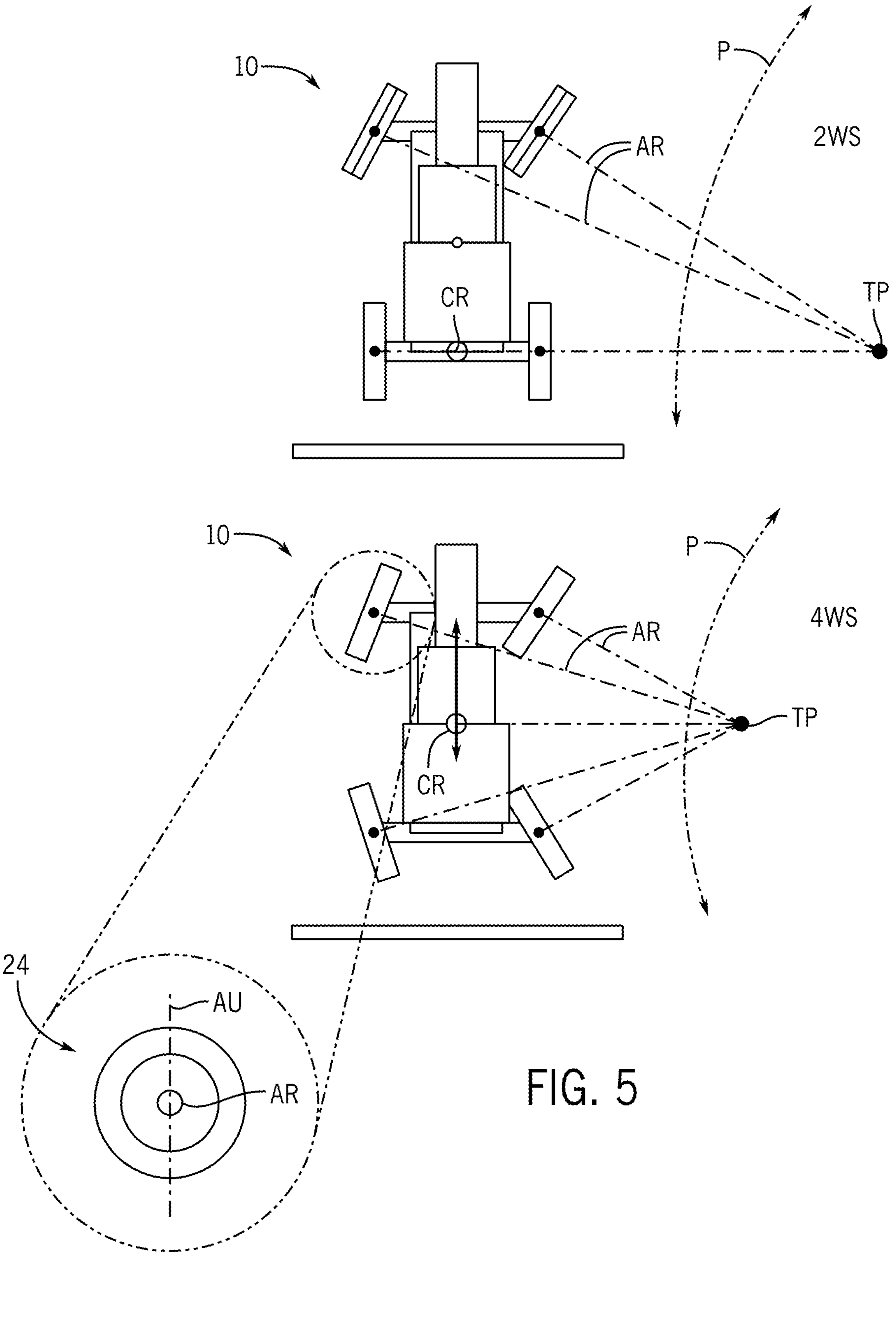
FIG. 5 shows example diagrammatic views of the work vehicle as having either two-wheel or four-wheel steering.

In some instances, the control system 46 can also be configured to monitor a center of rotation of the work vehicle 10. The control system 46 can determine a change in a center of rotation of the work vehicle 10 when transitioning between the 4WS mode and the 2WS mode. In some instances, the change in the center of rotation can be used by the control system 46 to determine a rate of change in the trajectory curvature. An example center of rotation of the work vehicle 10 is illustrated in FIG. 5. By detecting a change in the center of rotation, for the control system 46 can provide an adaptive steering response, which is useful when the work vehicle 10 switches between four-wheel and 2WS modes. For example, in a 4WS mode, the work vehicle can turn more sharply, potentially moving the center of rotation closer to the middle of the work vehicle 10. When transitioning to 2WS, the center of rotation may shift, typically towards the rear of the work vehicle 10. By monitoring these changes, the control system 46 can adjust the steering dynamics to maintain optimal maneuverability and stability. Additionally, understanding the change in the center of rotation aids the control system 46 in calculating the rate of change in the trajectory curvature. This calculation can inform adjustments to steering commands to ensure the desired path is maintained smoothly and efficiently, enhancing the operator's control over the work vehicle 10 and improving its overall performance in various operational scenarios.

Figure 3:
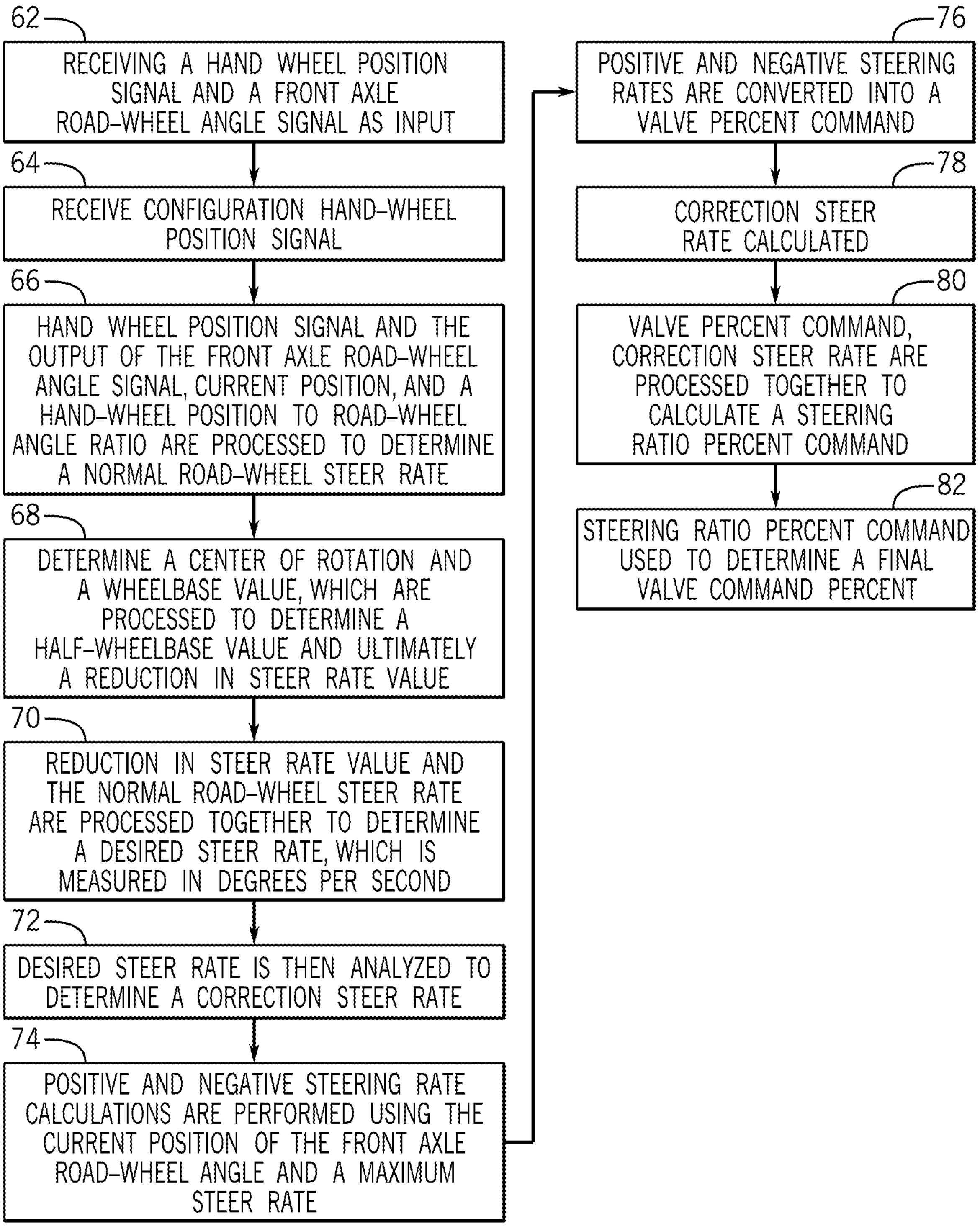
FIGS. 3 and 4 are process diagrams of an example method of the present disclosure for providing a constant velocity input to the steering system of the work vehicle.

FIG. 3 is a process diagram of an example method of the present disclosure. The method includes receiving an operator control position signal and a front axle steering angle signal as input in step 62. The operator control position signal is referred to as a steering rate and the front axle steering angle is measured in degrees and expressed as a position. A configuration operator control position signal can also be input in step 64, which is analyzed to determine a current position (measured in degrees) and an operator control position to steering angle ratio. The operator control position signal and the output of the front axle steering angle signal, current position, and the operator control position to steering angle ratio are processed to determine a normal steer rate in step 66.

The method can also include a determination of a center of rotation value and a wheelbase value, which may be processed to determine a half-wheelbase value and ultimately a reduction in steer rate value in step 68. This reduction in steer rate value and the normal steer rate are processed together to determine a desired steer rate, which is measured in degrees per second, in step 70. The desired steer rate is then analyzed to determine a correction steer rate in step 72. Positive and negative steering rate calculations are performed using the current position of the front axle steering angle and a maximum steer rate in step 74. The positive and negative steering rates are converted into a valve percent command in step 76 and then into a correction steer rate in step 78. The valve percent command and correction steer rate are processed together to calculate a steering ratio percent command in step 80. This steering ratio percent command is used to determine a final valve command percent in step 82 that is sent by the control system 46 to the cylinder control valve 42. It will be understood that the units of measure described are not limiting.

Figure 4:
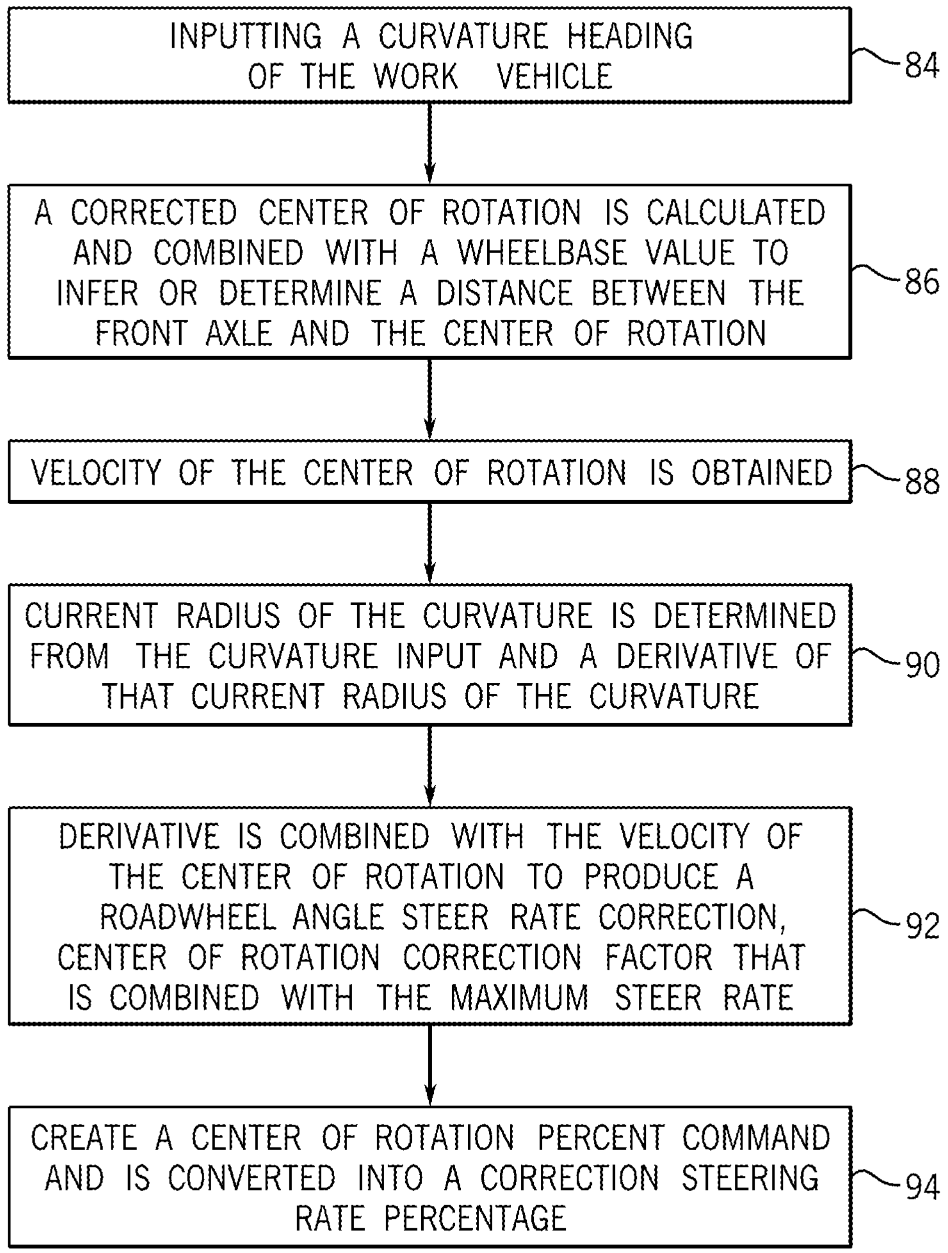

FIG. 4 illustrates a related method pertaining to the use of the center of rotation of the work vehicle 10 that generates input to determine the steering ratio percent command discussed in FIG. 3. In one embodiment, the method begins at step 84 by inputting a trajectory curvature of the work vehicle 10, measured in degrees per second, along with a center of rotation. A corrected center of rotation is calculated and combined with a wheelbase value to infer or determine a distance between the front axle and the center of rotation in step 86. A velocity of the center of rotation is calculated in step 88.

This derivative is combined with the velocity of the center of rotation to produce a steering angle steer rate correction, center of rotation correction factor that is combined with the maximum steer rate in step 92 to create a front steering correction command based on CoR motion. and is converted into a correction steering rate percentage in step 94. This center of rotation percent command is processed in combination with the steering ratio percent command (FIG. 3 step 80) to generate the final valve command percent (FIG. 3 step 82).

Transitioning Between 2WS and 4WS

The disclosed steering control system 46 can also serve to maintain a constant trajectory curvature during the transition between multi-axle steering (described herein as 4WS) and single axle steering (described herein as 2WS) modes by utilizing an inline velocity of the center of rotation/center of geometry (CoR) to predict and adjust the steering rate at the front axle. The control system 46 aims to ensure the work vehicle 10 maintains its intended trajectory without abrupt changes in turn radius that could otherwise occur during such mode transitions. In manual steering systems, changing from 4WS to 2WS, or vice versa might unexpectedly alter the vehicle's turn radius, either doubling or halving it, which could compromise maneuverability and precision.

Some embodiments involve incorporating a feed-forward term at the control system level that can be used to correspondingly adjust the steering angles of the front ground engaging members 24 (or a single mean effective steering angle of the front axle) in correlation with the CoR inline velocity (using commands provided to the cylinder control valve). This strategy is designed to maintain constant curvature during the transition by ensuring that the front axle rotates at a rate that aligns the vehicle along the same turn radius, thereby avoiding sudden directional or radius alterations. Unlike closed-loop control, which could restrict manual steering adjustments by the operator, the control system employs an open-loop (feed-forward) control mechanism. This approach allows manual steering commands to influence the vehicle's direction without being counteracted by automated adjustments, ensuring that operators can modify the steering during transitions.

An example implementation of this method involves calculating a rate of rotation for the front ground engaging members 24 to maintain the desired trajectory curvature of the work vehicle 10. This calculation may use trigonometric functions and derivatives based on the work vehicle's geometry and the movement (and velocity) of the CoR. Additionally, to address the limitations imposed by the work vehicle's steering geometry (which may have been originally designed based on Ackerman principles for a fixed rear axle alignment), the control system 46 computes a mean effective front steering angle. This calculation takes into account potential slippage, providing a simplified control input for the axle, which does not allow for independent angle adjustments of each front tire.

This approach ensures that operators can transition between steering modes while in motion, facilitating smooth and precise control without compromising the ability to adjust the turn radius mid-turn. It also addresses the technical challenge of maintaining consistent vehicle behavior and curvature during mode transitions. Embodiments of the present disclosure can implement a method to dynamically adjust the steering rate based on the CoR's inline velocity, a consideration not accounted for in manual steering systems. This feature enhances maneuverability and operational efficiency for work vehicles requiring versatile steering capabilities.

In some instances, steering precision and responsiveness can be enhanced, particularly during transitions between steering modes. In some instances, the control system 46 can either determine and/or apply a velocity limit to the velocity of the center of rotation (CoR) to a predefined maximum, based on steer rate limits. This approach ensures that the velocity at which the CoR moves does not surpass the operational capabilities of the hydraulic steering system 22, as commanded by the steering input from the operator control 20.

The steer rate limits are predefined parameters within the control system 46, representing the maximum rate at which the vehicle's steering can be adjusted. To be sure, parameters can be predefined based on the expected valve, pressure, a flow of the expected system or calibrated with steering response tests to tailor to a specific machine. These limits are used in scenarios where rapid CoR adjustments are necessary. By establishing a maximum velocity for the CoR change, the control system 46 prevents the vehicle from attempting to execute steering changes that exceed the physical or operational capabilities of the steering system, thereby ensuring a smoother transition between steering configurations.

This determination or limitation of the CoR's maximum velocity is a direct response to the steering input velocity received from the operator control 20. The control system 46 can continuously monitor the steering input to detect any changes in the desired curvature heading or steering mode. Upon identifying a change that requires adjusting the velocity of the change in the CoR, the control system 46 calculates the necessary parameters for this adjustment. If the calculated velocity exceeds the predefined steer rate limits, the control system 46 automatically limits the CoR's velocity to the maximum allowable value. This functionality can be accomplished by direct rate limitation of the CoR position command prior to entry into the control system, as opposed to modulation at the actuator control loop level, thereby adjusting the hydraulic flow or pressure within the hydraulic steering system 22, as managed by the control system 46 and the cylinder control valve 42 in accordance with the computed transition steering input.

Furthermore, this control strategy ensures that the adjustments made to the steering system are both proactive and anticipatory, aligning with the concept of a feed-forward control mechanism. That is, the feed-forward control is preserved in the ability of the control system 46 to predict and preemptively adjust to changes, ensuring the work vehicle's steering remains within the operational parameters defined by the steer rate limits.

Figure 6:
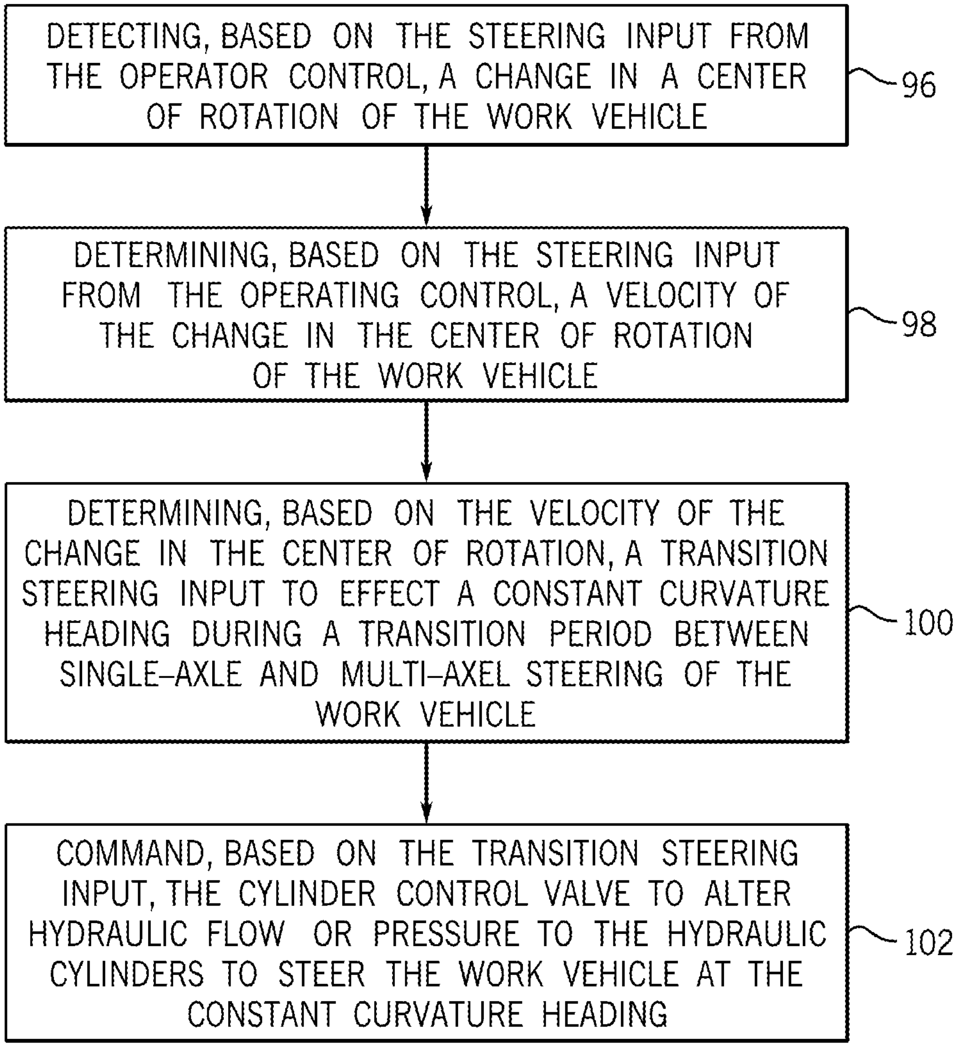
FIG. 6 is a process diagram of an example method for maintaining a constant curvature heading for the work vehicle when transitioning between steering modes.

Referring to FIGS. 2, 5, and 6 collectively, with FIG. 5 illustrating both a 2WS mode and a 4WS mode for a work vehicle 10. The control system 46 is designed to detect changes in a center of rotation CoR of the work vehicle 10 based on steering command from the operator control 20. The position of the CoR is determinative of the work vehicle's turning radius and maneuverability. By accurately identifying any adjustments made by the operator to the steering, the control system 46 can determine corresponding shifts in the CoR. This allows for the precise management of the work vehicle's steering dynamics, ensuring that adjustments to the work vehicle's travel path P or orientation are accurately reflected in the response generated by the control system 46.

As illustrated, the CoR is positioned at the rear axle in a 2WS mode, and the CoR tends to be positioned near a middle of the work vehicle 10 when in a 4WS mode. However, the CoR may vary along a longitudinal center line between and extending beyond the front and rear ends of the chassis 14. Changes in the mode of steering, from 2WS to 4WS (or any other location that is not explicitly 4WS, and vice versa, will cause the CoR to migrate. How quickly this migration happens is referred to as a velocity of change of the CoR.

Following the detection of a change in the CoR, the control system 46 proceeds to determine a velocity of this change, based on the steering command from the operator control 20. The velocity at which the CoR moves is used to calibrate a response needed to maintain a constant trajectory curvature (the turn rate needed to keep the vehicle on path P). By quantifying the speed of the CoR's movement, the control system 46 can tailor subsequent actions of the cylinder control valve 42 and hydraulic cylinders 30 of the front axle to match the specific dynamics of the transition. This determination of the velocity of the CoR ensures that the control system 46 can adapt to changes in steering command with precision.

With the CoR velocity change established, the control system 46 then determines a transition steering command to maintain a constant trajectory curvature during the transition period. This involves calculating steering adjustments needed to compensate for the change in the CoR, ensuring that the work vehicle's path remains constant despite the transition.

Finally, the control system 46 commands the cylinder control valve 42 to alter hydraulic flow or pressure to the hydraulic cylinders 30 based on the determined transition steering command. This action effects physical steering of the work vehicle 10 according to the calculated requirements for maintaining a constant trajectory curvature as determined by the control system 46.

The front ground engaging members 24 are configured to rotate about an upright axis of rotation AR that is approximately orthogonal to the trajectory curvature (vehicle path P). That is, the axis around which these members rotate is perpendicular to the direction the vehicle path P. This orthogonal relationship ensures that the work vehicle 10 can steer effectively and maintain its intended path.

Furthermore, the front engaging members 24 are capable of turning about an upright steering axis AU that is orthogonal to the axis of rotation AR. The AU may be vertical or canted in one or more directions at an angle from vertical. A close-up view in FIG. 5 illustrates one of the ground engaging members 24 and its AU and AR. The AU, around which the ground engaging members pivot to change direction, is positioned vertically and perpendicular to the AR as depicted. The ground engaging members can thus pivot in a manner that directly influences the vehicle's direction, without interfering with the rotational movement that propels the work vehicle 10 forward or rearward.

In some embodiments, the control system 46 is configured to calculate the steering rate at which the front ground engaging members 24 turn about the AUs. This capability allows the control system 46 to precisely determine the speed and extent of steering adjustments needed to achieve the desired trajectory curvature or to navigate through various terrains and obstacles. By calculating the steering rate, the control system 46 can optimize the turning movements of the front ground engaging members 24, ensuring that they are synchronized and aligned with the overall steering objectives. Any adjustments to the turning of the front ground engaging members 24 are effectuated with commands provided to the cylinder control valve 42 and ultimately the hydraulic cylinders 30.

In some embodiments, the control system 46 is configured to adjust the steering rate of the front ground engaging members 24 so that the AR of each of the front ground engaging members 24 intersects a turning radius point TP. That is, the radius of the trajectory curvature for the work vehicle 10 has a projected point in space, referred to as the TP. The control system 46 is configured to adjust the steering rate of the front ground engaging members 24 so that the AR of each of the front ground engaging members 24 points to the turning radius point TP. As the work vehicle is transitioning between steering modes, the change in the velocity of the CoR affects the ability of the work vehicle 10 to maintain a constant trajectory curvature. Ideally, the AR of each of the front ground engaging members 24 points to the TP during mode transitions to maintain a constant trajectory curvature.

As noted above, the control system 46 may perform the control process by calculating a mean effective angle for the front axle, which represents the average of the predicted radii created by each ground engaging member based on the Ackerman geometry, converted back to an angle. This calculation of the mean effective angle is an example approach to achieving precise steering control. By averaging the steering angles, the control system 46 can generate a singular, effective steering command that reflects the combined influence of both ground engaging members on the work vehicle's trajectory curvature with more optimized processing efficiency.

Additionally, the control system 46 is configured to adjust this mean effective angle of the front axle. This adjustment is executed by commanding the cylinder control valve 42 to modify hydraulic flow or pressure within the hydraulic cylinders 30. Such alterations directly impact the steering rate of the front ground engaging members 24. These adjustments ensure that the AR for each ground engaging member 24 aligns with the TP.

In some embodiments, the control system 46 is configured to respond to operator inputs and to manage the work vehicle's steering dynamics in response. When the operator provides a steering command, the control system 46 is configured to detect any change in the work vehicle's center of rotation, as discussed above. This capability allows the control system 46 to interpret how the operator's steering actions translate to movement adjustments of the work vehicle 10. Following the detection of a change in the CoR, the control system 46 employs algorithms to determine the velocity of this change. By understanding the rate at which the CoR is moving, the control system 46 can implement adjustments to work vehicle steering responses. Based on the velocity of the CoR change, the control system 46 calculates a transition steering command. This input is used to maintain a constant trajectory curvature during the period between 4WS and 4WS modes.

To implement the calculated transition steering command, the control system commands the cylinder control valve 42 to modify hydraulic flow or pressure to the hydraulic cylinders 30 of the front ground engaging members 24, allowing the work vehicle 10 to steer along the desired constant trajectory curvature. By adjusting the hydraulic steering system 22 in response to dynamic steering requirements, the control system 46 ensures that the work vehicle 10 can adapt to operator inputs and environmental conditions, maintaining a stable and predictable path.

In various embodiments, the control system 46 is configured to dampen a change in a steering rate associated with the steering command or a change in the CoR of the work vehicle 10 or both. In various embodiments, the control system 46 is configured to mitigate sudden variations in the steering rate or positional shifts in the CoR of the work vehicle 10, potentially addressing both factors concurrently. This approach ensures a smoother and more predictable steering experience, particularly beneficial in turning maneuvers or when precise control is needed. By moderating rapid changes in steering dynamics, the control system 46 contributes to enhanced vehicle stability and handling, providing a crucial advantage in various work contexts where equipment maneuverability is critical.

In yet other embodiments, the control system 46 is configured to receive operator input of the CoR of the work vehicle 10 and effect a CoR change based on the operator input not to exceed a CoR rate threshold. Here, the control system 46 adjusts hydraulic flow or pressure during the transition period, ensuring changes do not exceed a predetermined steering rate threshold. This threshold serves as a limit to prevent sudden or excessive alterations in steering behavior, enhancing vehicle control and safety.

FIG. 6 illustrates an example method that can be implemented by the work vehicle 10, and specifically the control system 46. The method can include a step 96 of detecting, based on the steering command from the operator control 20, a change in CoR of the work vehicle 10. By detecting changes in the CoR, the control system 46 can dynamically adjust the work vehicle's steering responses, enhancing maneuverability and operational efficiency.

For example, consider a scenario where the work vehicle 10 is operating in a confined field, requiring tight turns and precise control. The operator inputs a steering command aiming to navigate around an obstacle. The control system 46, detecting a change in the desired CoR based on this input, adjusts the steering mechanics to align with the new path. This adjustment could involve altering the hydraulic flow to the steering cylinders, thus changing the angle of the wheels and subsequently. The method can then include step 98 of determining, based on the steering command from the operating control, the velocity of the change in the CoR.

In some embodiments, the method includes the step 100 of determining, based on the velocity of the change in the CoR, a transition steering command to effect a constant trajectory curvature during the transition period between 4WS and 2WS modes of the work vehicle 10. In essence, to compensate for the velocity change due to the mode transition, a corrective factor is applied (transition steering command) to control the steering response such that a constant trajectory curvature is maintained. Again, this feature is notable in situations where the work vehicle 10 is being driven in a curved path, such as when turning at the end of a crop row. The method can also include a step 102 of commanding, based on the transition steering command, the cylinder control valve 42 to alter hydraulic flow or pressure to the hydraulic cylinders 30 to steer the work vehicle 10 at the constant trajectory curvature.

CONCLUSION

There has thus been described advanced steering control systems for integration into work vehicles. The disclosed embodiments of the steering control system offer precise management, adaptive response, and enhanced control features aimed at significantly reducing the operational complexity and maintenance needs of work vehicles, while concurrently improving steering accuracy and vehicle reliability. In certain embodiments, sensor data related to steering command velocity and steering angles are processed and stored in memory, facilitating an in-depth analysis of steering performance. This data enables the refinement of steering control algorithms, thereby optimizing the steering response according to varying operational conditions. Additionally, such sensor data can be transmitted to network-connected data centers, allowing for the remote monitoring of work vehicle steering system health and enabling the provision of customized maintenance recommendations or adjustments to the vehicle's servicing schedule. Operator awareness of steering system status and potential adjustments to steering command requirements may also be communicated through display devices within the operator cabin, enhancing operational safety and system transparency. For work vehicles equipped with advanced steering features, such as variable steering response based on operational parameters, the processing subsystem of the steering control system can execute specialized algorithms to dynamically adjust steering commands and hydraulic flow, ensuring optimal steering performance. Furthermore, in the realm of semi-autonomous and autonomous work vehicles, these processing subsystems leverage the described functionalities to refine operational commands related to vehicle steering, thereby maximizing vehicle uptime, efficiency, and durability in diverse working environments.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A steering control system for a work vehicle comprising:

an operator control providing a steering input indicating a curvature heading of the work vehicle;

a hydraulic steering system having a steering pump, hydraulic cylinders, and a cylinder control valve responsive to the steering input from the operator control to effect the curvature heading; and a control system having processor and memory architecture coupled to the operator control and the hydraulic steering system and configured to:

detect, based on the steering input from the operator control, a change in a center of rotation of the work vehicle;

determine, based on the steering input from the operating control, a velocity of the change in the center of rotation of the work vehicle;

determine, based on the velocity of the change in the center of rotation, a transition steering input to effect a constant curvature heading during a transition period between single-axle and multi-axle steering of the work vehicle; and command, based on the transition steering input, the cylinder control valve to alter hydraulic flow or pressure to the hydraulic cylinders to steer the work vehicle at the constant curvature heading.

2. The steering control system of claim 1, wherein the work vehicle comprises a first axle and a second axle having ground engaging members associated with the hydraulic cylinders; and wherein the first axle includes a first of the ground engaging members and a first of the hydraulic cylinders and a second of the ground engaging members and a second of the hydraulic cylinders.

3. The steering control system of claim 2, wherein the first and second ground engaging members each rotate about an axis of rotation that is orthogonal to a turning point radius;

wherein the first and second ground engaging members each turn about an upright steering axis that is orthogonal to the axis of rotation; and wherein the control system is configured to calculate a steering rate at which the first and second ground engaging members turn about the associated steering axis.

4. The steering control system of claim 3, wherein the control system is configured to adjust the steering rate of the first and second ground engaging members so that the axis of rotation of each of the first and second ground engaging members intersects a turning radius point.

5. The steering control system of claim 4, wherein the control system is configured to determine a mean effective angle of the first axle that is an average of the steering angles of the first and second ground engaging members.

6. The steering control system of claim 5, wherein the control system is configured to adjust the mean effective angle of the first axle by causing the cylinder control valve to alter hydraulic flow or pressure to the hydraulic cylinders to change the steering rate of the first and second ground engaging members so that the axis of rotation of each of the first and second ground engaging members intersects a turning radius point.

7. The steering control system of claim 1, wherein the control system is further configured to:

monitor the steering input from the operator control during the transition period; and adjust the transition steering input based on the steering input from the operator control to effect a different constant curvature heading.

8. The steering control system of claim 1, wherein the control system is configured to dampen a change in a steering rate associated with the steering input or a change in the center of rotation of the work vehicle or both.

9. The steering control system of claim 8, wherein the control system is configured to cause the cylinder control valve to adjust the alteration of the hydraulic flow or pressure to the hydraulic cylinders during the transition period not to exceed a steering rate threshold.

10. The steering control system of claim 8, wherein the control system is configured to receive operator input of the center of rotation of the work vehicle and effect a change in the center of rotation of the work vehicle based on the operator input not to exceed a center of rotation rate threshold.

11. A work vehicle comprising:

a front axle and a rear axle, the front axle comprising ground engaging members, the ground engaging members mounted to a chassis to support the chassis off the ground;

steering assembly carried by the chassis including:

an operator control providing a steering input indicating a curvature heading of the work vehicle;

a hydraulic steering system having a steering pump, hydraulic cylinders, and a cylinder control valve responsive to the steering input from the operator control to effect the curvature heading; and a control system having processor and memory architecture coupled to the operator control and the hydraulic steering system and configured to:

detect, based on the steering mode input from the operator control, a change in a center of rotation of the work vehicle;

determine, based on the steering input from the operating control, a velocity of the change in the center of rotation of the work vehicle;

determine or apply a velocity limit, using a predefined steer rate limit and the steering input, so that the velocity of the change in the center of rotation does not exceed a maximum velocity during the transition period;

determine, based on the velocity of the change in the center of rotation and the limit, a transition steering input to effect a constant curvature heading during a transition period between single-axle and multi-axle steering of the work vehicle; and command, based on the transition steering input, the cylinder control valve to alter hydraulic flow or pressure to the hydraulic cylinders to steer the work vehicle at the curvature heading.

12. The work vehicle of claim 11, wherein the front axle includes a first of the ground engaging members and a first of the hydraulic cylinders and a second of the ground engaging members and a second of the hydraulic cylinders.

13. The work vehicle of claim 12, wherein the first and second ground engaging members each rotate about an axis of rotation that is orthogonal to a turning point radius;

wherein the first and second ground engaging members each turn about an upright steering axis that is orthogonal to the axis of rotation; and wherein the control system is configured to calculate a steering rate at which the first and second ground engaging members turn about the associated steering axis.

14. The work vehicle of claim 13, wherein the control system is configured to adjust the steering rate of the first and second ground engaging members so that the axis of rotation of each of the first and second ground engaging members intersects a turning radius point.

15. The work vehicle of claim 14, wherein the control system is configured to determine a mean effective angle of the front axle that is an average of the steering angles of the first and second ground engaging members.

16. The work vehicle of claim 15, wherein the control system is configured to adjust the mean effective angle of the front axle by causing the cylinder control valve to alter hydraulic flow or pressure to the hydraulic cylinders to change the steering rate of the first and second ground engaging members so that the axis of rotation of each of the first and second ground engaging members intersects a turning radius point.

17. The work vehicle of claim 11, wherein the control system is further configured to:

monitor the steering input from the operator control during the transition period; and adjust the transition steering input based on the steering input from the operator control to effect a different constant curvature heading.

18. The work vehicle of claim 11, wherein the control system is configured to dampen a change in a steering rate associated with the operator input or a change in the center of rotation of the work vehicle or both.

19. The work vehicle of claim 18, wherein the control system is configured to cause the cylinder control valve to adjust the alteration of the hydraulic flow or pressure to the hydraulic cylinders during the transition period not to exceed a steering rate threshold.

20. The work vehicle of claim 18, wherein the control system is configured to receive operator input of the center of rotation of the work vehicle and effect a change in the center of rotation of the work vehicle based on the operator input not to exceed a center of rotation rate threshold.

* * * * *